(12) United States Patent
Tojima et al.

(10) Patent No.: US 9,377,779 B2
(45) Date of Patent: Jun. 28, 2016

(54) TRAVEL-RESTRICTED AREA SETTING SYSTEM FOR UNMANNED TRAVELING VEHICLE AND COMPUTER PROGRAM FOR SETTING TRAVEL-RESTRICTED AREA OF UNMANNED TRAVELING VEHICLE

(75) Inventors: Masanori Tojima, Fujisawa (JP); Koji Takeda, Tama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/119,044

(22) PCT Filed: Jun. 15, 2012

(86) PCT No.: PCT/JP2012/065427
§ 371 (c)(1),
(2), (4) Date: Nov. 20, 2013

(87) PCT Pub. No.: WO2012/173256
PCT Pub. Date: Dec. 20, 2012

(65) Prior Publication Data
US 2014/0107882 A1      Apr. 17, 2014

(30) Foreign Application Priority Data

Jun. 17, 2011    (JP) .................................. 2011-135042

(51) Int. Cl.
*G05D 1/00* (2006.01)
*E02F 9/20* (2006.01)
(Continued)

(52) U.S. Cl.
CPC ...... *G05D 1/00* (2013.01); *E02F 9/205* (2013.01); *E02F 9/207* (2013.01); *E02F 9/2045* (2013.01);
(Continued)

(58) Field of Classification Search
None
See application file for complete search history.

(56) References Cited

U.S. PATENT DOCUMENTS 4,587,383 A * 5/1986 Stoldt ..................... B60M 7/00
                                                     191/12 R
7,574,821 B2 * 8/2009 Furem ..................... E02F 3/434
                                                        172/2
(Continued)

FOREIGN PATENT DOCUMENTS

CN      1380921 A      11/2002
JP      54-125801 A     9/1979
(Continued)

OTHER PUBLICATIONS

International Search Report dated Sep. 18, 2012, issued for PCT/JP2012/065427.
(Continued)

*Primary Examiner* — John R Olszewski
*Assistant Examiner* — Jess Whittington
(74) *Attorney, Agent, or Firm* — Locke Lord LLP; James E. Armstrong, IV; Brian S. Matross

(57) ABSTRACT

A computer program product for setting a travel-restricted area for an unmanned traveling vehicle, where a travel of a vehicle traveling with no man attended is restricted in a workplace of an electric work machine that operates with electricity supplied via a cable from an external power supply, the computer program causing a computer to execute: estimating a position of the cable based on at least information on a position of the electric work machine, information on a position of a support body that supports the cable, and a length of the cable between the electric work machine and the support body, and setting the travel-restricted area based on the estimated position of the cable.

12 Claims, 11 Drawing Sheets

(51) Int. Cl.
  *E02F 9/26* (2006.01)
  *G05D 1/02* (2006.01)
  *H02G 11/02* (2006.01)

(52) U.S. Cl.
  CPC .............. *E02F 9/262* (2013.01); *G05D 1/0214* (2013.01); *G05D 1/0278* (2013.01); *G05D 1/0297* (2013.01); *G05D 2201/021* (2013.01); *H02G 11/02* (2013.01)

(56) References Cited

U.S. PATENT DOCUMENTS

| | | | |
|---|---|---|---|
| 7,931,133 B2 * | 4/2011 | Vannest | B65H 75/4463 191/12.2 R |
| 7,970,508 B2 | 6/2011 | Ozaki | |
| 8,863,921 B2 * | 10/2014 | Cohen | B65H 57/10 191/12.2 R |
| 2002/0165656 A1 | 11/2002 | Adachi et al. | |
| 2007/0195011 A1 | 8/2007 | Hatori et al. | |
| 2007/0282532 A1 | 12/2007 | Yamamoto et al. | |
| 2009/0265962 A1 * | 10/2009 | Koch | E02F 9/2033 37/413 |
| 2009/0266664 A1 * | 10/2009 | Everett | B60Q 1/52 191/12 C |
| 2010/0308641 A1 * | 12/2010 | Brewka | E21C 47/04 299/64 |
| 2011/0093170 A1 * | 4/2011 | Yuet | B65H 75/425 701/50 |
| 2012/0146387 A1 * | 6/2012 | Shatters | E21F 13/08 299/1.9 |

FOREIGN PATENT DOCUMENTS

| | | |
|---|---|---|
| JP | 08-158403 A | 6/1996 |
| JP | 2008-140375 A | 6/2008 |
| JP | 2010-025800 A | 2/2010 |
| JP | 2010-065445 A | 3/2010 |

OTHER PUBLICATIONS

Office Action, issued in corresponding Japanese Patent Application No. JP 2011-135042, dated Apr. 16, 2015.

* cited by examiner

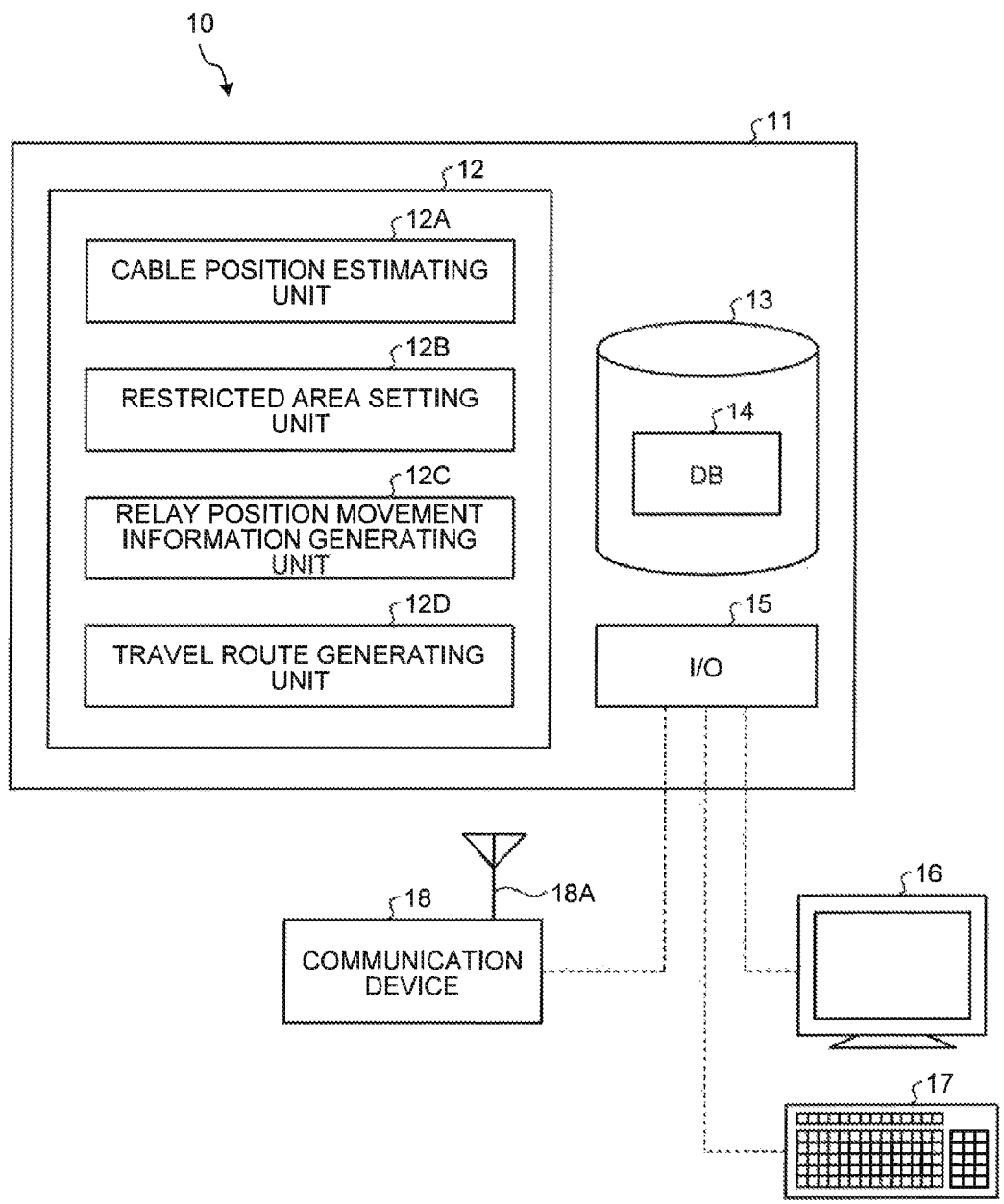

TRAVEL-RESTRICTED AREA SETTING SYSTEM FOR UNMANNED TRAVELING VEHICLE AND COMPUTER PROGRAM FOR SETTING TRAVEL-RESTRICTED AREA OF UNMANNED TRAVELING VEHICLE

FIELD

The present invention relates to a technique of setting an area where the travel of an unmanned traveling vehicle is restricted in a workplace such as an excavation site of a mine or a construction site of plant.

BACKGROUND

In mines, construction sites, or the like, machines such as a power shovel performs excavation to load excavated ores, sand, or the like onto a dump truck which is a delivery vehicle. In recent years, machines used in such a workplace have been electrically operated. For example, Patent Literature 1 discloses an electric work machine (an electric excavator) that is driven with the electricity supplied through a power cable.

CITATION LIST

Patent Literature

Patent Literature 1: Japanese Laid-open Patent Publication No. 2010-65445

SUMMARY

Technical Problem

For example, when an electric power shovel is used as a power shovel used for excavating ores in an excavation site of a mine, the power shovel often receives the supply of electricity via a cable from a power supply. In this case, the cable is often pulled around in the excavation site as a workplace. A dump truck also travels the excavation site as a vehicle that loads and delivers the ores or sand excavated by the power shovel. Thus, if the dump truck treads on the cable, the durability of the cable may deteriorate. Therefore, it is necessary to set an area where the travel of the vehicle is restricted in order to prevent the vehicle traveling the excavation site from treading on the cable.

Since the technique of Patent Literature 1 relates to a method of operating a hybrid automobile that receives the supply of electricity via a current collector from an overhead line, a problem in that the vehicle treads on the cable is not mentioned, and there is still room for improvement. Moreover, depending on the size of the area where the travel of the vehicle is restricted, there is a concern that the area where the vehicle can travel in the workplace may decrease. Therefore, there is room for improvement in setting the area where the travel of the vehicle is restricted in the workplace.

An object of the present invention is to broaden an area where a vehicle can travel, when setting an area where the travel of the vehicle is restricted in order to prevent the vehicle from treading on a cable that supplies electricity from a power supply to machines.

Solution to Problem

According to the present invention, a travel-restricted area setting system for an unmanned traveling vehicle, comprises: an electric work machine that operates with electricity supplied via a cable from an external power supply; a work machine position detecting device that is mounted on the electric work machine so as to detect information on a position of the electric work machine; a work machine communication device that is mounted on the electric work machine so as to transmit the information on the position of the electric work machine detected by the work machine, position detecting device; a support body that supports the cable; and a management device having a communication device that receives the information on the position of the electric work machine transmitted from the work machine communication device, wherein the management device estimates a position of the cable based on at least the information on the position of the electric work machine, information on a position of the support body, and a length of the cable between the electric work machine and the support body, and the management device sets a travel-restricted area where a travel of a vehicle traveling with no man attended is restricted based on the estimated position of the cable.

In the present invention, it is preferable that the travel-restricted area setting system for the unmanned traveling vehicle, farther comprises: a relay support body that is disposed between the support body and the electric work machine so as to movably support the cable, wherein the management device estimates the position of the cable using information on a position of the relay support body.

In the present invention, it is preferable that the relay support body comprises: a relay support body position detecting device that is mounted on the relay support body so as to detect information on the position of the relay support body; and a relay support body communication device that is mounted on the relay support body so as to transmit the information on the position of the relay support body detected by the relay support body position detecting device, and the management device estimates the position of the cable using the information on the position of the relay support body detected by the relay support body position detecting device.

In the present invention, it is preferable that the management device uses a history of a change in the position of the relay support body due to a movement of the relay support body as the information on the position of the relay support body.

In the present invention, it is preferable that the management device uses a direction following the cable between the relay support body and the electric work machine as a moving direction of the relay support body.

In the present invention, it is preferable that the electric work machine is an electric power shovel used in a mine.

According to the present invention, a computer program for setting a travel-restricted area for an unmanned traveling vehicle, where a travel of a vehicle traveling with no man attended is restricted in a workplace of an electric work machine that operates with electricity supplied via a cable from an external power supply, the computer program causing a computer to execute: estimating a position of the cable based on at least information on a position of the electric work machine, information on a position of a support body that supports the cable, and a length of the cable between the electric work machine and the support body, and setting the travel-restricted area based on the estimated position of the cable.

In the present invention, it is preferable that the position of the cable is estimated using information on a position of a relay support body that is disposed between the support body and the electric work machine so as to movably support the cable.

In the present invention, it is preferable that a history of a change in the position of the relay support body due to a movement of the relay support body is used as the information on the position of the relay support body.

In the present invention, it is preferable that a direction following the cable between the relay support body and the electric work machine is used as a moving direction, of the relay support body.

In the present invention, it is preferable that the electric work machine is an electric power shovel used in a mine.

According to the present invention, it is possible to broaden an area where a vehicle can travel when setting an area where the travel of the vehicle is restricted in order to prevent the vehicle from treading on a cable that supplies electricity from a power supply to machines.

BRIEF DESCRIPTION OF DRAWINGS

FIG. 2 is a functional block diagram illustrating the management device according to the present embodiment.

FIG. 5-1 is a schematic diagram illustrating an example of a structure of a power relay cart according to the present embodiment.

FIG. 5-2 is a perspective view illustrating a modification of a relay support body according to the present embodiment.

FIG. 9-1 is an explanatory diagram illustrating a second modification of a method of estimating a cable position in the travel-restricted area setting method according to the present embodiment.

FIG. 9-2 is an explanatory diagram illustrating the second modification of a method of estimating a cable position in the travel-restricted area setting method according to the present embodiment.

FIG. 9-3 is an explanatory diagram illustrating the second modification of a method of estimating a cable position in the travel-restricted area setting method according to the present embodiment.

FIG. 9-4 is an, explanatory diagram illustrating the second modification of a method of estimating a cable position in the travel-restricted area setting method according to the present embodiment.

DESCRIPTION OF EMBODIMENTS

A mode (embodiment) for embodying the present invention will be described in detail with reference to the drawings. The present invention is not limited to the content described in the following embodiment. Moreover, constituent components described below include substantially the same components that can easily occur to those skilled in the art. Further, the constituent components described below can be appropriately combined. In addition, various omissions, substitutions, or changes in the constituent components can be made without departing from the spirit of the present invention.

<Application Site of Travel-Restricted Area Setting System of Unmanned Traveling Vehicle>

Figure 1:
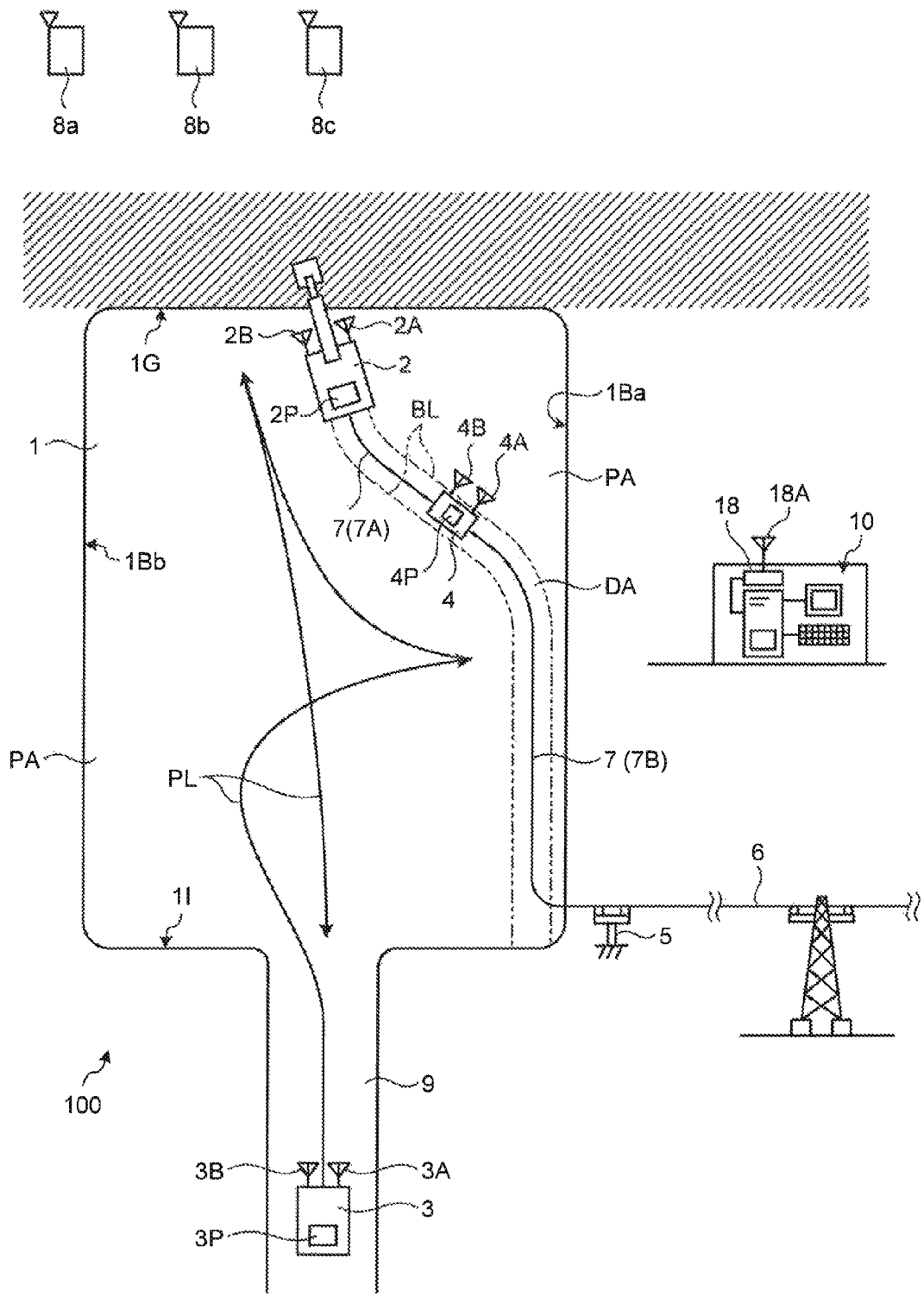
FIG. 1 is a diagram illustrating a site in which a management device according to the present embodiment is applied.

FIG. 1 is a diagram illustrating a site in which a management device according to the present embodiment is applied. In the present embodiment, a management device 10 included in a travel-restricted area setting system 100 for an unmanned traveling vehicle is used when setting a travel-restricted area of an unmanned traveling vehicle that travels or works in an excavation site 1 of a mine as a workplace. An application of the travel-restricted area setting system 100 for an unmanned traveling vehicle is not limited to a mine, but can be applied to a case of setting a travel-restricted area of machines used in a construction site of, for example, creation, a plant, a factory, an airport, or a harbor.

The excavation site 1 is surrounded by an excavation side 10, an entrance side 1I, and side portions 1Ba and 1Bb. The excavation site 1 illustrated in the present, embodiment is only an example, and practically, there are various forms of excavation sites. A shovel 2 as an excavating machine that excavates ores or the like, a dump truck 3 as a delivery vehicle that delivers ores, or sand or rocks generated during excavation of the ores, and other machines are working in the excavation site 1. The dump truck 3 is an unmanned traveling vehicle that can travel and discharge with no man attended as described later. Moreover, the shovel 2 is an electrically driven machine that is driven with electricity as described later. Thus, the shovel 2 receives the supply of electricity from an external power supply unit (for example, a power transmission line) 6 as a power supply through a cable 7. As above, the shovel 2 corresponds to an electric work machine that operates with the supply of electricity from a power supply through the cable 7. Moreover, in the present embodiment, the shovel 2 can excavate and travel with no man attended.

The dump truck 3 delivers the ores excavated by the shovel 2 or the sand or rocks generated during the excavation of the ores by carrying them on be bed. In the present embodiment, the dump truck 3 can travel with no man attended. Moreover, the dump truck 3 travels mainly on unpaved roads since the dump truck 3 is a machine (a mining machine) used in the excavation site 1 of a mine. In the present embodiment, the shovel 2 receives the supply of electricity from the external power supply unit 6 through the cable 7 included in a power relay cart 4 as a relay support body. The relay support body is a device that is disposed between a support body (a supporting post 5) described later and the electric work machine (the shovel 2) so as to movably support the cable 7 and may travel by itself and may be moved by another means. The power relay cart 4 is a device that adjusts the length of the cable 7 between the shovel 2 and the supporting post 5 as a support body that stands at a position where the cable 7 is drawn into the excavation site 1 so as to support the cable 7, and can travel with no man attended. In the following description, the cable 7 located closer to the shovel 2 than the power relay cart 4 will be referred to as a first cable 7A and the cable 7 located closer to the supporting post 5 than the power relay cart 4 will be referred to as a second cable 7B as necessary. In the present embodiment, the power relay cart 4 is not always necessary.

The shovel 2 is controlled by a shovel controller 2P. The dump truck 3 is controlled by a dump truck controller 3P. Moreover, the power relay cart 4 is controlled by a relay cart controller 4P. The shovel controller 2P, the dump truck controller 3P, and the relay cart controller 4P are micro control units (MCUs), for example. The shovel 2, the dump truck 3, and the power relay cart 4 have a function of detecting their own positions by receiving radio signals from global positioning system (GPS) satellites 8a, 8b, and 8c. The own positions detected by the shovel 2, the dump truck 3, and the power relay cart 4 are transmitted to the management device 10 and are used for controlling and managing the same.

The shovel 2, the dump truck 3, and the power relay cart 4 respectively have GPS antennas 2A, 3A, and 4A in order to receive the radio signals from the GPS satellites 8a, 8b, and 8c. Moreover, the shovel 2, the dump truck 3, and the power relay cart 4 respectively have wireless communication antennas 2B, 3B, and 4B in order to wirelessly exchange information with the management device 10. The management device 10 exchanges information directly with the shovel controller 2P, the dump truck controller 3P, and the relay cart controller 4P by wireless communication with the aid of the wireless communication antennas 2B, 3B, and 4B, a management device-side wireless communication antenna 18A, and a communication device 18. The management device 10 may exchange information with the shovel controller 2P, the dump truck controller 3P, and the relay cart controller 4P with the aid of a communication circuit.

In the present embodiment, the dump truck 3 and the power relay cart 4 can travel with no man attended and is controlled, by the management device 10. Moreover, the shovel 2 is operated and controlled by an operator.

In the excavation site 1, the ores and the like excavated by the shovel 2 are carried out of the excavation site 1 by the dump truck 3. Thus, the dump truck 3 enters into the excavation site 1 through a passage 9 that leads to the excavation site 1 and travels inside the excavation site 1 up to the position of the shovel 2. The dump truck 3 on which the ores and the like are loaded by the shovel 2 travels from the inside of the excavation site 1 to a storage area or a discharge area of the ores through the passage 9. In the present embodiment, the dump truck 3 travels along a travel route PL set in advance by the management device 10 so that the dump truck 3 travels with no man attended.

In the present embodiment, since the shovel 2 receives the supply of electricity from the external power supply unit 6, the cable 7 is disposed in the excavation site 1. Since the durability of the cable 7 may deteriorate when, the dump truck 3 or the shovel 2 passes over the cable 7, a predetermined range around the cable 7 is set as a travel-restricted area DA where the travel of vehicles such as the shovel 2 and the dump truck 3 is restricted. In the present embodiment, an area surrounded by boundary lines BL, separated to both sides by a, predetermined distance from the cable 7 as the center and provided along the cable 7, is set as the travel-restricted area DA. Moreover, an area outside of the travel-restricted area DA of the excavation site 1 is set as a travel-allowed area PA where the travel of vehicles such as the shovel 2 and the dump truck 3 is allowed. By doing so, the shovel 2, the dump truck 3, and the like travel the travel-allowed area PA only and do not enter the travel restricted area DA. Moreover, when the management device 10 generates a travel route PL of the dump truck 3, the management device 10 generates the travel route PL within the travel-allowed area PA excluding the travel-restricted area DA of the excavation site 1. The power relay cart 4 can enter and travel the travel-restricted area DA.

<Management Device>

Figures 1, 5:
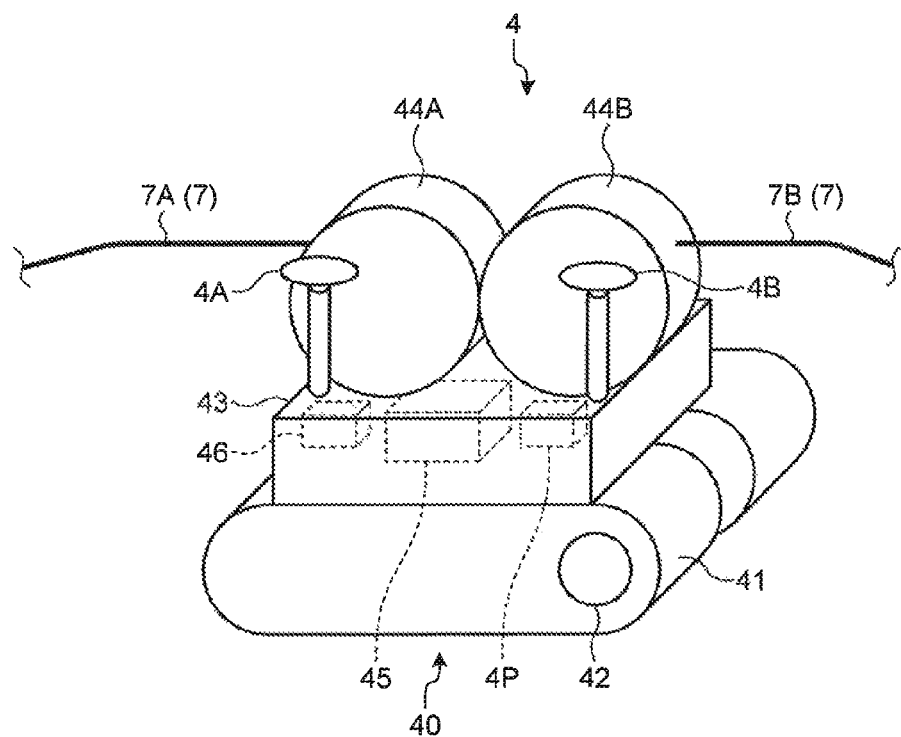
Figures 2, 5:
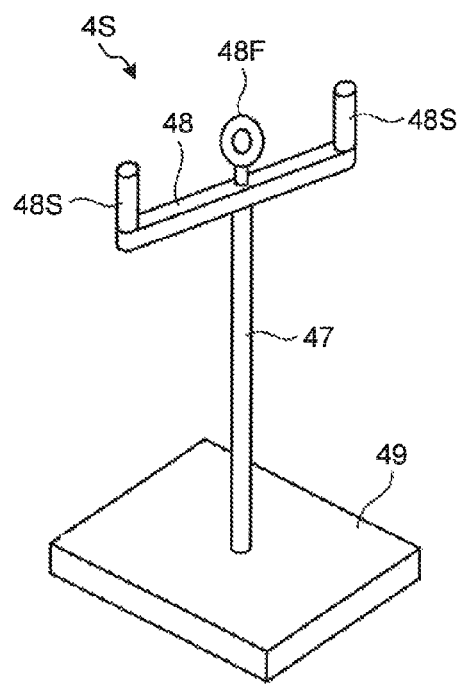

FIG. 2 is a functional block diagram illustrating the management device according to the present embodiment. The management device 10 includes a processing device 11, a display device 16, an input, device 17, and the communication device 18. The processing device 11 includes an arithmetic unit 12, a storage unit 13, and an input and output unit (I/O) 15. The processing device 11 is a computer, for example. The arithmetic unit 12 is a central, processing unit (CPU), for example. The storage unit 13 is a random access memory (RAM), a read only memory (ROM), a flash memory, a hard disk drive, or the like, for example. The input and output unit 15 is used for inputting and outputting information between the processing device 11 and the display device 16, the input device 17, and the communication device 18 which are externally connected to the processing device 11.

The arithmetic unit 12 includes a cable position estimating unit 12A, a restricted area setting unit 12B, a relay position movement information generating unit 12C, and a travel route generating unit 12D. The cable position estimating unit 12A estimates the position of the cable 7 based on at least machine position information as information on the position of the shovel 2, information on the position of the supporting post 5 that supports the cable 7, and the length of the cable 7 from the shovel 2 to the supporting post 5. The cable position estimating unit 12A further estimates the position of the cable 7 based on information on at least two positions between the shovel 2 and the supporting post 5 and the length of the cable 7 from the shovel 2 to the supporting post 5.

The restricted area setting unit 12B sets the travel-restricted area DA where the travel of vehicles is restricted based on the position of the cable 7 estimated by the cable position estimating unit 12A. The relay position movement information generating unit 12C sets a direction along the cable 7 the first cable 7A) between the power relay cart 4 and the shovel 2 as the moving direction of the power relay cart 4. The travel route generating unit 12D generates the travel route PL of the dump truck 3 traveling inside the excavation site 1 based on information on the position of the excavation site 1 (excavation site position information) and information on the position of the travel-restricted area DA (travel-restricted area position information). The functions of the cable position estimating unit 12A, the restricted area setting unit 12B, the relay position movement information generating unit 12C, and the travel route generating unit 12D are realized when the processing device 11 which is a computer executes a computer program for setting a travel-restricted area of unmanned traveling vehicle to realize the functions of the cable position estimating unit 12A and the like by reading the same from the storage unit 13. The storage unit 13 stores the computer program, a database (DB) 14, and the like. The database 14 is a database that describes information used for managing the movement of the shovel 2, the dump truck 3, and the power relay cart 4.

The display device 16 is a liquid crystal display, for example, and displays information necessary for managing the movement of the shovel 2, the dump truck 3, and the power relay cart 4. The input device 17 is a keyboard, a touch panel, or a mouse, for example, and inputs information necessary for managing the movement of the shovel 2, the dump truck 3, and the power relay cart 4. The communication device 18 includes the management device-side wireless communication antenna am and exchanges information with the shovel controller 2P, the dump truck controller 3P, and the relay cart controller 4P by wireless communication. Next, the structure of the shovel 2 will be described.

<Structure of Shovel>

Figure 3:
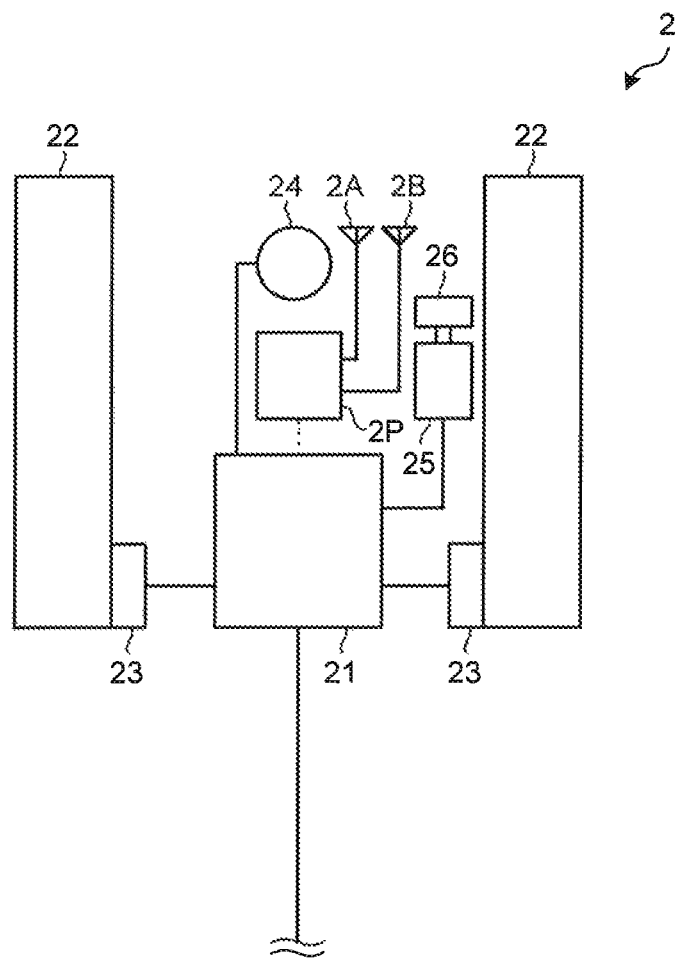
FIG. 3 is a schematic diagram illustrating an example of a structure of a shovel according to the present embodiment.

FIG. 3 is a schematic diagram illustrating an example of the structure of the shovel according to the present embodiment. As described above, the shovel 2 is an electric power shovel. The shovel 2 is operated and controlled by an operator who is on board. The shovel 2 includes the shovel controller 2P, a motor controller 21, a pair of crawler belts 22, two travel motors 23, a revolving motor 24, a hydraulic pressure generating motor 25, a hydraulic pump 26, the SOS antenna 2A, and the wireless communication antenna 2B.

The shovel 2 travels when the respective crawler belts 22 are driven by the two travel motors 23. Moreover, the revolving motor 24 causes an upper revolving structure of the shovel 2 to revolve. The hydraulic pressure generating motor 25 drives the hydraulic pump 26 to generate hydraulic power necessary for driving operating machines (devices including a boom, an arm, and a bucket) included in the shovel 2. The motor controller 21 receives the supply of electricity from the external power supply unit 6 illustrated in FIG. 1 through the power relay cart 4. Moreover, the motor controller 21 supplies electricity to and drives the travel motor 23, the revolving motor 24, and the hydraulic pressure generating motor 25 according to an instruction from the shovel controller 2P.

The shovel controller 2P controls the motor controller 21 to control the driving and regeneration of the travel motor 23, the revolving motor 24, and the hydraulic pressure generating motor 25. When the shovel 2 brakes and the upper revolving structure of the shovel 2 stops, the travel motor 23 and the revolving motor 24 generate power (regeneration). The shovel controller 2P controls the motor controller 21 to supply the power generated by the travel motor 23 and the revolving motor 24 back to a power supply system with the aid of the power relay cart 4. Moreover, the shovel controller 2P exchanges information, with the management device 10 illustrated in FIG. 1 with the aid of the wireless communication antenna 2B and searches for its own position based on the radio signals from the GPS satellites 8a, 8b, and 8c obtained from the GPS antenna 2A to transmit the position to the management device 10. In this manner, the shovel controller 2P has the function of a work machine position detecting device that detects information on the position of the shovel 2. Moreover, the shovel controller 2P also has the function of a work machine communication device that transmits information on the position of the shovel 2 detected by itself.

In, the present embodiment, the constituent components of the shovel 2 driven by a motor are not limited to the above. For example, only the crawler belt 22 of the shovel 2 may be driven by a motor, only the operating machine may be driven by a motor, and only the upper revolving structure may be driven by a motor. Moreover, at least one of the crawler belt 22, the operating machine, and the upper revolving machine of the shovel 2 may be driven by a motor. For example, in a case where the operating machine is driven by a motor, the motor may operate to generate power when the boom goes down.

In the present embodiment, the shovel controller 2P causes the shovel 2 to travel and excavate ores or sand according to an operation of an operator. The management device 10 may control the shovel controller 2P at a remote site to control the operation of the shovel 2. Moreover, the shovel controller 2P may cause the shovel 2 to travel and excavate while acquiring information on the travel or excavation of the shovel 2 from the storage unit 13 of the management device 10 and confirming its own position based on the radio signals from the GPS satellites 8a, 8b, and 8c.

<Structure of Dump Truck>

Figure 4:
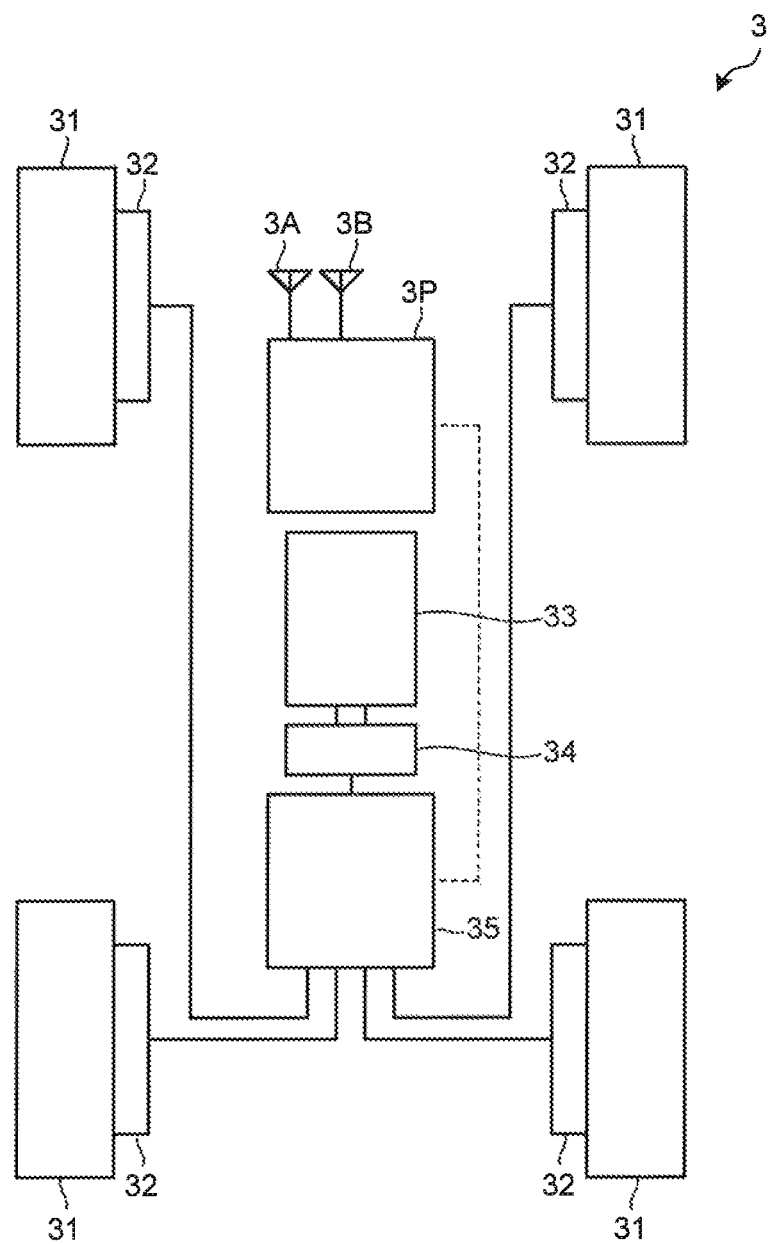
FIG. 4 is a schematic diagram illustrating an example of a structure of a dump truck according to the present embodiment.

FIG. 4 is a schematic diagram illustrating an example of the structure of the dump truck according to the present embodiment. The dump truck 3 includes the dump truck controller 3P, a plurality of (four in the present embodiment) wheels 31, motors 32 for driving the respective wheels 31, an internal combustion engine 33, a generator 34, a motor controller 35, the GPS antenna 2A, and the wireless communication antenna 2B. Although the dump truck 3 uses a so-called in-wheel motor type where the motor 32 is disposed on the inner circumferential side of the wheel 31, the driving method thereof is not limited to this. Moreover, although the dump truck 3 includes the motors 32 that are provided to all, wheels 31, the motors 32 may be provided only to two rear wheels or two front wheels, for example. Although at least two wheels of the dump truck 3 among the four wheels 31 are steered wheels, all wheels 31 may be steered wheels. The respective motors 32 are driven by the power generated by the generator 34 that is driven by the internal combustion engine 33.

The power (AC power) generated by the generator 34 is input to the motor controller 35 that includes an inverter and then, is supplied to and drives the plurality of motors 32. The dump truck controller 3P controls the motor controller 35 to control the driving or regeneration of the respective motors 32. The motor controller 35 is also connected to a current collector 36. The motor controller 35 can also drive the motors 32 by receiving the supply of electricity from an overhead line TL via the current collector 36. Moreover, by using the motors 32 as a generator when the dump truck 3 brakes, the motors can generate (regenerate) power while braking the dump truck 3. The power generated at that time is charged to a power storage device such as a capacitor or a secondary battery mounted on the dump truck 3, for example.

The dump truck controller 3P exchanges information with the management device 10 illustrated in FIG. 1 with the aid of the wireless communication antenna 2B. Moreover, the dump truck controller 3P drives the motors 32 with the power obtained by the generator 34 that is driven by the internal combustion engine 33. Moreover, the dump truck controller 3P exchanges information with the management device 10 illustrated in FIG. 1 with the aid of the wireless communication antenna 3B and searches for its own position based on the radio signals from the GPS satellites 8a, 8b, and 8c obtained from the GPS antenna 3A to transmit the position to the management device 10. In this manner, the dump truck controller 3P has the function of an unmanned vehicle position detecting device that detects information on the position of the dump truck 3. Moreover, the dump truck controller 3P also has the function of an unmanned vehicle communication device that transmits information on the position of the dump truck 3 detected by itself.

In the present embodiment, the dump truck controller 3P causes the dump truck 3 to travel and unload the ores or the like which are the cargo according to an instruction from the management device 10. In this manner, the dump truck controller 3P is operated by the management device 10 at a remote site. Moreover, the dump truck controller 3 may cause the dump truck 3 to travel along the travel route PL while acquiring the travel route PP from the storage unit 13 of the management device 10 and confirming its own position based on the radio signals from the GPS satellites 8a, 8b, and 8c.

<Structure of Power Relay Cart>

FIG. 5-1 is a schematic diagram illustrating an example of the structure of the power relay cart according to the present embodiment. The power relay cart 4 includes a traveling device 40, a cart 43, a first cable drum 44A, a second cable drum 44B, the relay cart controller 42, a power transmission relay unit 45 to which the cable 7 is connected, the GPS antenna 4A, the wireless communication antenna 4B, and a communication device 46. The traveling device 40 includes a pair of left and right crawler belts 41 and a pair of left and right travel motors 42 that generates motive power from electricity to drive the crawler belts 41. The traveling device 40 is connected to the cart 43. The traveling device 40 causes the power relay cart 4 to travel by causing the travel motors 42 to drive the crawler belts 41. The traveling device 40 is preferably a crawler-type traveling device that uses the crawler belts 41 but may be another traveling device that uses tires or the like. In this manner, the power relay cart 4 can travel and move with the aid of the traveling device 40.

The first cable drum 44A is a device that can reel in and out the first cable 7A, and the second cable drum 44B is a device that can reel in and out the second cable 7B. The first and second cable drums 44A and 44B are all mounted on the cart 43. The first and second cable drums 44A and 44B have a cylindrical shaft portion and have a hollow structure therein. An opening portion that communicates the inside and the outside of the shaft portion is formed in a portion of the shaft portion. Moreover, the first and second cable drums 44A and 44B have a guide portion that restricts a reeling range in an axial direction of the shaft portion when the drums reel in or out the first and second cables 7A and 7B. The guide portion is a disk-shaped member and is provided near both ends of the shaft portion. The central axis of the disk is identical to the central axis of the shaft portion. The first and second cables 7A and 7B both are configured to make their ends on one side inserted into the shaft portion from the opening portion of the shaft portion. Due to such a structure, the first and second cable drums 44A and 44B can reel in and out the first and second cables 7A and 7B.

The first and second cables 7A and 7B have end portions on sides where the cables are inserted into the shaft portion of the first cable drum 44A and the shaft portion of the second cable drum 44B, which are pulled out to the outside of the shaft portion from one of end portions of the respective shaft portions and are connected to the power transmission relay unit 45 that is held by the cart 43. In this manner, the bower transmission relay unit 45 to which the first and second cables 7A and 7B are connected relays the first and second cables 7A and 7B. The power transmission relay unit 45 may be a device that performs only electrical relay between the first and second cables 7A and 7B, and the relay cart controller 4P that controls the power relay cart 4 may also serve as the power transmission relay unit 45.

The first and second cable drums 44A and 44B are connected to a cable driving motor. The cable driving motor causes the first and second cable drums 44A and 44B to rotate about the respective central axes as a rotating shaft. Due to such a structure, the first and second cable drums 44A and 44B can reel in and, out the first and second cables 7A and 7B, respectively.

The first and second cable drums 44A and 44B are disposed so that the rotating shafts of the first and second cable drums 44A and 44B are perpendicular to input and output shafts of the travel motor 42 that drives the crawler belts 41 and the rotating shafts are parallel to the front-rear direction of the power relay cart 4. The first cable 7A has an end portion on a side opposite to the side where the cable is connected to the power transmission relay unit 45, which is electrically connected to the shovel 2 so that electricity is exchanged between the first cable 7A and the shovel 2. The second cable 75 has an end portion on a side opposite to the side where the cable is connected to the power transmission relay unit 45, which is electrically connected to the external, power supply unit 6 so that electricity is exchanged between the second cable 75 and the external power supply unit 6. The first and second cable drums 44A and 44B are disposed so that the respective rotating shafts are parallel to the front-rear direction of the power relay cart 4. Moreover, the first and second cables 7A and 7B extend in opposite directions in relation to the front-rear direction of the power, relay cart 4.

The relay cart controller 4P controls the operation of the travel motor 42 to cause the power relay cart 4 to travel or stop and to drive the cable driving motor, thereby causes the first and second cable drums 44A and 44B to reel in or out the first and second cables 7A and 7B, respectively. Moreover, the relay cart controller 4P exchanges information with the management device 10 illustrated in FIG. 1 with the aid of the communication device 46 and the wireless communication antenna 4B. Further, the relay cart controller 4P obtains its own position based on the radio signals from the GPS satellites 8a, 8b, and 8c obtained from the GPS antenna 4A and transmits the position to the management device 10 with the aid of the communication device 46 and the wireless communication antenna 4B. In this manner, the relay cart controller 4P has the function of a relay support body position detecting device that detects information on the position of the relay support body. The communication device 46 has the function of a relay support body communication device that transmits the information on the position of the power relay cart 4 detected by the relay cart controller 4P.

The relay cart controller 4P causes the power relay cart 4 to travel and causes the cable 7 to be reeled in or out based on the information obtained, from the management device 10. The structure of the power relay cart 4 is not limited to this, and the cable 7 may be reeled in or out by one drum.

In the present embodiment, the relay cart controller 4P causes the power relay cart 4 to travel and causes the cable 7 to be reeled in and out according to an instruction from the management device 10. In this manner, the relay cart controller 4P is operated by the management device 10 at a remote site. Moreover, the relay cart controller 4P may cause the power relay cart 4 to travel while acquiring information on the travel of the power relay cart 4 from the storage unit 13 of the management device 10 and confirming its own position based on the radio signals from the GPS satellites 8a, 8b, and 8c.

<Modification of Relay Support Body>

FIG. 5-2 is a perspective view illustrating a modification of the relay support body according to the present embodiment. A moving relay post 43 as a relay support body includes a post 47, a cable support body 48, an insulator 48S, a lifting hook 48F, and a pedestal 49. The post 47 has one end portion fixed to the pedestal 49 and the other end attached to the cable support body 48. The cable support body 48 is a rod-shaped member and the insulators 48S are attached to both ends thereof. The insulator 48S supports the cable 7 illustrated in FIG. 1 and electrically isolates the cable 7 from the cable support body 48, the post 47, and the pedestal 49. The lifting hook 48F is attached near a central portion of the cable support body 48.

The moving relay post 4S is provided in the excavation site 1 illustrated in FIG. 1 so as to support the cable 7 between the supporting post 5 and the shovel 2. When the moving relay post 4S is moved, the moving relay post 4S is lifted by a crane or the like with the aid of the lifting hook 48F of the moving relay post 4S, for example, and is moved to another place of the excavation site 1. In this manner, the relay support body is not limited to such a device that can travel by itself like the power relay cart 4 but may be one which can be moved by another moving means like the moving relay post 4S.

In the present embodiment, the moving relay post 4S may mount thereon a relay support body position detecting device that detects information on the position of the moving relay post 4S and a relay support body communication device that transmits the information on the position of the moving relay post 4S detected by the relay support body position detecting device. The relay support body position detecting device obtains its own position based on the radio signals from the GPS satellites 8a, 8b, and 8c obtained from the GPS antenna. Moreover, the relay support body communication device transmits the information on the position of the moving relay post 4S detected by the relay support body position detecting device to the management device 10 illustrated in FIG. 2 via a communication antenna. The cable position estimating unit 12A of the management device 10 estimates the position of the cable 7 using the acquired information on the position of the moving relay post 4S.

Moreover, the moving relay post 4S may not mount thereon the relay support body position detecting device and the relay support body communication device. In this case, the information on the position of the moving relay post 4 is acquired from the GPS satellites 8a, 8b, and 8c, for example, whenever the operator moves the moving relay most 4S. Moreover, the operator updates the information on the position of the moving relay post 4 by storing the acquired information in the storage unit 13 of the management device 10. Next, a method (travel-restricted area setting method) of setting a travel-restricted area for an unmanned traveling vehicle according to the present embodiment will be described.

<Travel-Restricted Area Setting Method>

Figure 6:
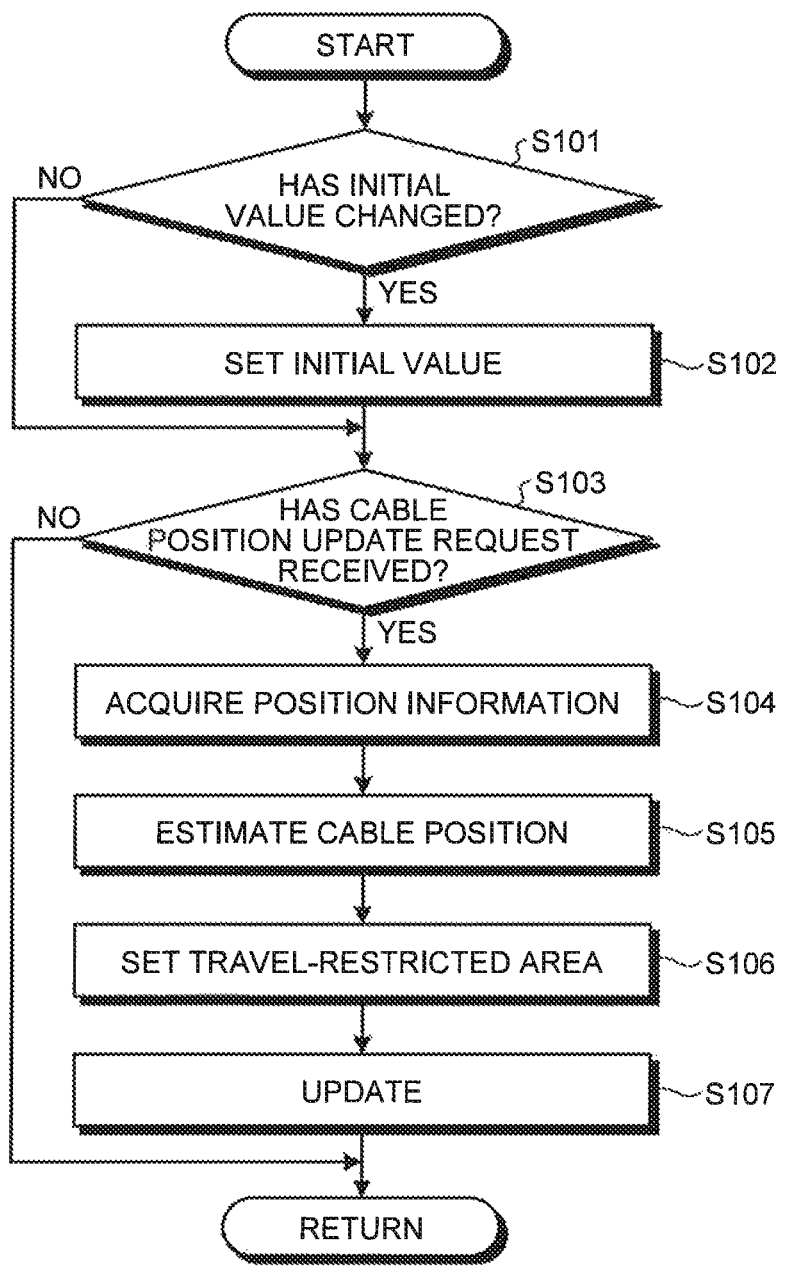
FIG. 6 is a flowchart illustrating a travel-restricted area setting method according to the present embodiment.
Figure 7:
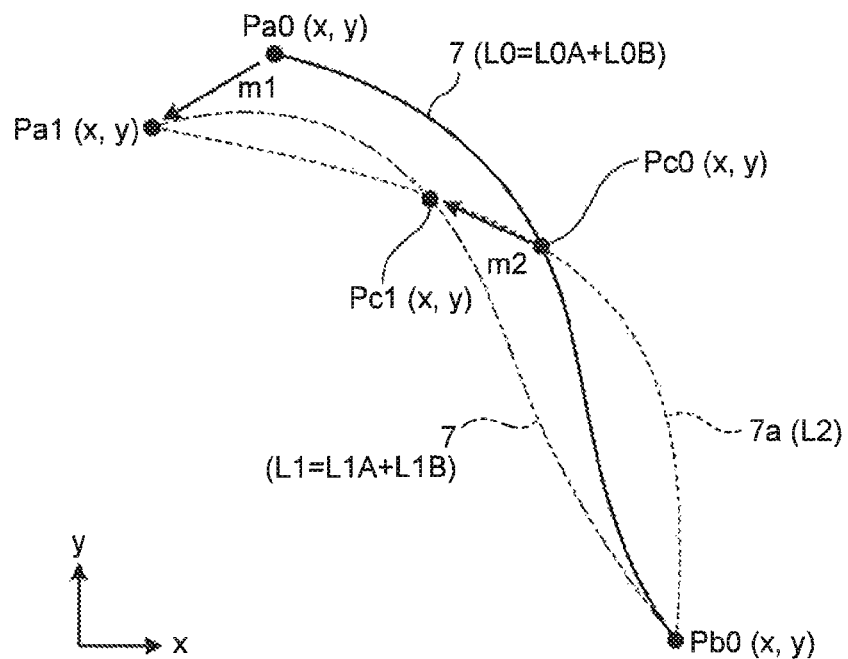
FIG. 7 is an explanatory diagram illustrating a travel-restricted area setting method according to the present embodiment.

FIG. 6 is a flowchart illustrating a travel-restricted area setting method according to the present embodiment. FIG. 7 is an explanatory diagram illustrating the travel-restricted area setting method according to the present embodiment. The travel-restricted area setting method according to the present embodiment is realized by the management device 10 of the travel-restricted area setting system 100 for the unmanned traveling vehicle illustrated in FIG. 1. That is, the arithmetic unit 12 of the management device 10 illustrated in FIG. 2 reads and executes the computer program for setting a travel-restricted area for an unmanned traveling vehicle stored in the storage unit 13 to thereby realize the travel-restricted area setting method according to the present embodiment. In the following description, although one power relay cart 4 is illustrated, the number of power relay carts 4 is not limited to one. When executing the travel-restricted area setting method according to the present embodiment, the management device 10 proceeds to step S102 when an initial value is changed (Yes in step S101) and proceeds to step S103 when the initial value is not changed (No in step S101).

When the initial value is changed (Yes in step S101), the initial value is set to the management device 10 in step S102. The initial value is input when the operator operates the input device 17 of the management device 10 so that the input device 17 inputs the initial value to the storage unit 13. The case where the value is changed includes a case where the initial value is input to the management device 10 in a state where the initial value is not present.

In the present embodiment, the initial value is the position of the shovel 2, the position of the power relay cart 4, the position of the supporting post 5, the length of the cable 7 from the supporting post 5 to the shovel 2, the position of the cable 7, and the like before excavation starts, for example. The initial value is generally not changed until excavation in the excavation site ends once it was set before the excavation starts, and a new initial value is set when the shovel 2 or the like moves to another excavation site. In a case where the position of the shovel 2 or the like is moved greatly or the cable 7 or the power relay cart 4 is replaced in the excavation site, a new initial value may be set.

For example, as illustrated in FIG. 7, the position of the shovel 2, the position of the power relay cart 4, the position of the supporting post 5, and the position of the cable 7, and the like are expressed using z-y coordinates. In this example, the initial value (initial, position) of the position of the shovel 2 is set to Pa0(x,y), the initial value (initial position) of the position of the supporting post 5 is set to Pb0(x,y), and the initial value (initial position) of the position of the power relay cart 4 is set to Pc0(x,y). Since the power relay cart 4 is disposed between the supporting post 5 and the shovel 2, the initial value (initial length) L0B of the length of the cable 7 is the sum of the initial value (initial length) L0A of the length of the first cable 7A and the initial value (initial length) L0B of the length of the second cable 7B. That is, L0=L0A−L0B. The initial position of the cable 7 is, for example, the aggregate of the coordinates obtained by measuring the position of the cable 7 before the start of excavation between the supporting post 5 and the shovel 2 at a predetermined interval. The aggregate of these coordinates may be approximated, for example, by a predetermined function (quadratic function, cubic function, or the like) and be used as the initial position of the cable 7. When electricity is supplied to the shovel 2 via the power relay cart 4, the initial position of the cable 7 is obtained for each of the first and second cables 7A and 7B and is set. The initial position Pa0(x,y) of the shovel 2, the initial position Pc0(x,y) of the power relay cart 4, and the like may use values measured actually on the spot and may use the position information of the shovel 2, the power relay cart 4, and the like acquired with the aid of the GPS antennas 2A, 4A, and the like included in the shovel 2, the power relay cart 4, and the like.

When the initial value is set in step S102 or when the initial value is not changed at the start of the execution, of the travel-restricted area setting method according to the present embodiment in step S101, the management device 10 proceeds to step S103. When a cable position update request is received in step S103 (Yes in step S103), the cable position estimating unit 12A of the management device 10 executes the process of step S104. When a cable position update request is not received in step S103 (No in step S103), the management device 10 executes the travel-restricted area setting method according to the present embodiment from the start again.

The case where the cable position update request is received is a case where a flag (update request flag) that requests updating of the position of the cable 7 is generated in the travel-restricted area setting method according to the present embodiment. The update request flag is generated, for example, when a moving distance of at least one of the shovel 2 and the power relay cart 4 exceeds a predetermined threshold moving distance. In such a case, since the movement of the cable 7 is large, it is determined that it is necessary to set the travel-restricted area DA illustrated in FIG. 1 again. Thus, in such a case, the management device 10 updates the position of the cable 7 and sets the travel-restricted area DA again.

In FIG. 7, it is assumed that the shovel 2 has moved in the direction indicated by arrow m1 from the initial position Pa0(x,y) and the power relay cart 4 has moved in the direction indicated by arrow m2 from the initial position Pc0(x,y) to exceed the threshold moving distance. The position of the shovel 2 after the movement is set to Pa1(x,y) and the position of the power relay cart 4 is set to Pc1(x,y). Since the position of the supporting post 5 does not change, the position is still.

Pb0(x,y). In this case, since the cable position update request is received (Yes in step S103), the cable position estimating unit 12A acquires the position information of the shovel 2 and the power relay cart 4 in step S104. In this case, for example, the cable position estimating unit 12A sends an instruction with the aid of the communication device 18 to the shovel 2 and the power relay cart 4 to transmit their own position information. Then, the shovel controller 20 of the shovel 2 and the relay cart controller 40 of the power relay cart 4 acquire the radio signals from GPS satellites 8a, 9b, and 9c to calculate their own positions (position information) and transmit the position information to the management device-side wireless communication antenna 18A of the management device 10 from the wireless communication antennas 2B and 4B. The cable position estimating unit 12A acquires the position information of the shovel 2 and the power relay cart 4 with the aid of the communication device 18. The position information of the shovel 2 is the coordinate Pa1(x,y) after the movement and the position information of the power relay cart 4 is the coordinate Pc1(x,y) after the movement. When the power relay cart 4 has changed the length of at least one of the first and second cables 7A and 7B, the cable position estimating unit 12A also acquires the length L1 of the cable 7 from the relay cart controller 4P of the power relay cart 4 with the aid of the communication device 18. In this example, the length of the first cable 7A after the movement of the shovel 2 and the power relay cart 4 is set to L1A, the length of the second cable 7B is set to L1B, and the length of the cable 7 is set to L1 (=L1A+L2A).

Subsequently, in step S105, the cable position estimating unit 12A estimates the position of the cable 7 after the movement of the shovel 2 and the like based on the coordinate Pa1(x,y) as the position information of the shovel 2 after the movement, the coordinate Pc1(x,y) as the position information of the power relay cart 4 after the movement, the coordinate Pb0(x,y) as the position information of the supporting post 5, and the length L1 (=L1A+L1B) of the cable 7 after the movement. As an example of a method of estimating the position of the cable 7, a method of obtaining a function that passes through three coordinates Pa1(x,y), Pb0(x,y), and Pc1 (x,y) after the movement of the shovel 2 and the like by interpolation (for example, spline interpolation), for example, is known. In this case, a constraint that the length of the cable between the coordinate Pa1(x,y) of the shovel 2 after the movement and the coordinate Pb0(x,y) of the supporting post 5 becomes L1 is applied. When the length of the cable 7 does not change before and after the movement, the value before the movement is used as the length L1 of the cable 7 after the movement.

The cable position estimating unit 12A obtains a function that passes through the three coordinates Pa1(x,y), Pb0(x,y), and Pc1(x,y) under the constraint that the length of the cable 7 is L1. The cable 7 indicated by a two-dot chain line in FIG. 7 passes through the three coordinates Pa1(x,y), Pb0(x,y), and Pc1(x,y) and has a length of L1. Thus, the cable position estimating unit 12A substitutes the position of the cable 7 stored in the storage unit 13 using the function that represents the cable 7 indicated by the two-dot chain line as the position of the cable 7 after the movement. In this manner, the cable position estimating unit 12A estimates the position of the cable 7 after the movement of the shovel 2 and the like and updates the position of the cable 7 before the movement.

Although a cable 7a indicated by a dot line in FIG. 7 passes through the three coordinates Pa1(x,y), Pb0(x,y), and Pc1(x,y), since the length L2 of the cable 7a is different from L1 (in this example, L2>L1), the position of the cable 7a is not used as the position of the cable 7 after the movement. In this case, when the difference between the estimated length L2 of the cable 7a and the length L1 of the cable 7 used in the estimation exceeds a predetermined threshold value, the cable position estimating unit 12A excludes the cable 7a having the length of L2 from the candidates for the cable 7 after the movement of the shovel 2 and the like. In this manner, the cable position estimating unit 12A can estimate the position of the cable 7 after the movement, more accurately by using the length L1 of the cable 7 before the movement as a constraint.

(First Modification of Cable Position Estimating Method)

Figure 8:
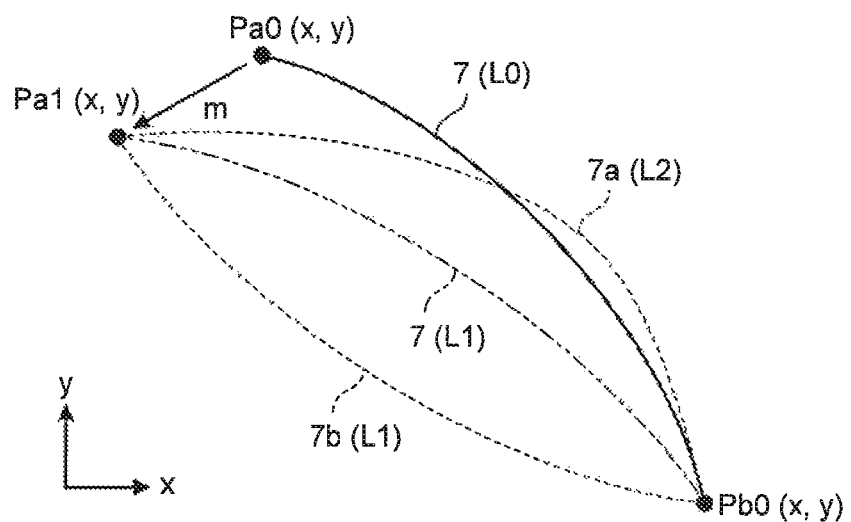
FIG. 8 is an explanatory diagram illustrating a first modification of a method of estimating a cable position in the travel restricted area setting method according to the present embodiment.

FIG. 8 is an explanatory diagram illustrating a first modification of a cable position estimating method in the travel restricted area setting method according to the present embodiment. In the above example, the cable position estimating unit 12A has estimated the cable position using the information on the position of the shovel 2, the information on the position of the power relay cart 4, and the information on the position of the supporting post 5. That is, the cable position estimating unit 12A has estimated the position of the cable 7 using the information (the positions of both ends of the cable 7, that is including the position of the shovel 2 and the position information of the supporting post 5) on three positions between the shovel 2 and the supporting post 5. In this modification, the cable position estimating unit 12A estimates the position of the cable 7 using the position information (the positions of both ends of the cable 7, that is including the position of the shovel 2 and the position of the supporting post 5) of two positions between the shovel 2 and the supporting post 5.

In this modification, it is assumed that the shovel 2 has moved in the direction indicated by arrow m of FIG. 8. The cable position estimating unit 12A estimates the position of the cable 7 after the movement of the shovel 2 and the like based on the coordinate Pa1(x,y) as position information of the shovel 2 after the movement, the coordinate Pb0(x,y) as the position information of the supporting post 5, and the length L1 of the cable 7 after the movement. As an example of a method of estimating the position of the cable 7, a method of obtaining a function that passes through two coordinates Pa1 (x,y) and Pb0(x,y) after the movement of the shovel 2 and the like by interpolation (for example, spline interpolation), for example, is known. In this case, a constraint that the length of the cable 7 between the coordinate Pa1(x,y) of the shovel 2 after the movement and the coordinate Pb0(x,y) of the supporting post 5 becomes L1 is applied. When the length of the cable 7 does not change before and after the movement, the value before the movement is used as the length L1 of the cable 7 after the movement.

The cable position estimating unit 12A obtains a function that passes through the two coordinates Pa1(x,y) and Pb0(x,y) under the constraint that the length of the cable 7 is L1. The cable 7 indicated by a two-dot chain line in FIG. 8 passes through the two coordinates Pa1(x,y) and Pb0(x,y) and has a length of L1. Thus, the cable position estimating unit 12A substitutes the position of the cable 7 stored in the storage unit 13 using the function that represents the cable 7 indicated by the two dot chain line as the position of the cable 7 after the movement. In this manner, the cable position estimating unit 12A estimates the position of the cable 7 after the movement of the shovel 2 and the like.

Although a cable 7a indicated by a dot line in FIG. 8 passes through the two coordinates Pa1(x,y) and Pb0(x,y), the length L2 of the cable 7a is different from L1 (in this example, L2>L1). Thus, the cable position estimating unit 12A does not use the cable 7a as the cable 7 after the movement of the shovel 2. Moreover, a cable 7b indicated by a dot line in FIG. 8 passes through the two coordinates Pa1(x,y) and Pb0(x,y), and the length of the cable 7b is L1 which is the same as the length L1 of the cable 7 used in the estimation. However, although the cable 7 before the movement has an upwardly convex shape in the x-y coordinate system, the cable 7b after the movement has a downwardly convex shape in the x-y coordinate system. That is, the function representing the cable 7 before the movement of the shovel 2 has an upwardly convex shape between the coordinates Pa0(x,y) and Pb0(x,y) in the x-y coordinate system, whereas the function representing the cable 7b after the movement has a downwardly convex shape between the coordinates Pa1(x,y) and Pb1(x,y). As above, when the shape of the function representing the cable 7b after the movement of the shovel 2 between the two coordinates of the cable 7b is chanced in a manner to be opposite to the function representing the cable 7 before the movement, such a cable 7b is not used as the cable 7 after the movement of the shovel 2.

(Second Modification of Cable Position Estimating Method)

Figures 1, 9:
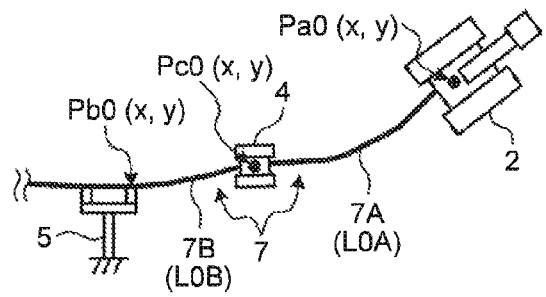
Figures 2, 9:
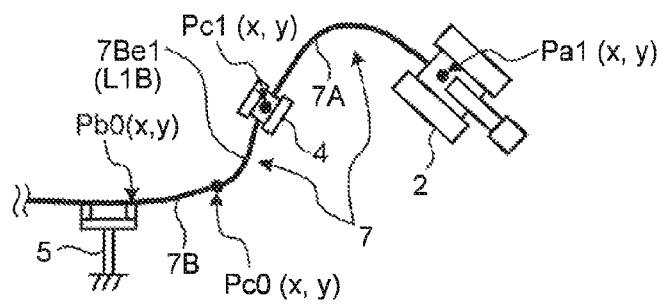
Figures 3, 9:
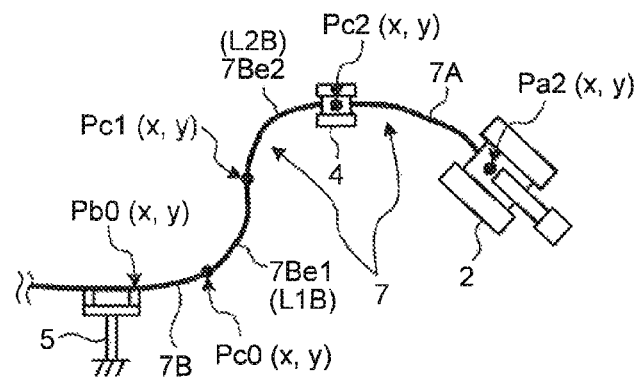
Figures 4, 9:
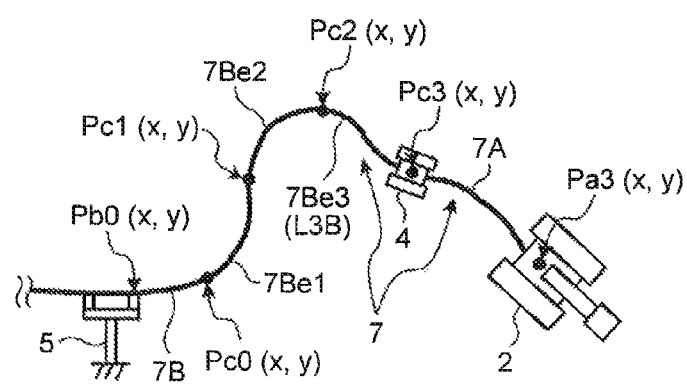

FIGS. 9-1 to 9-4 are explanatory diagrams illustrating a second modification of a cable position estimating method, in the travel-restricted area setting method according to the present embodiment. In this modification, the cable position estimating unit 12A uses the history of a change in the position of the power relay cart 4 due to the movement of the power relay cart 4 as the relay support body as the information (relay position information) on the position of the power relay cart 4. FIGS. 9-1 to 9-4 illustrate an example where the power relay cart 4 moves with the movement of the shovel 2 while reeling out the second cable 7B. The initial values are set such that the initial position of the shovel 2 is the coordinate Pa0(x,y), the initial position of the supporting post 5 is the coordinate Pb0(x,y), and the initial position of the power relay cart 4 is the coordinate Pc(x,y).

As illustrated in FIGS. 9-2 and 9-3, the position of the shovel 2 sequentially changes from the coordinate Pa0(x,y) to the coordinates Pa1(x,y), Pa2(x,y), and Pa3(x,y). The position of the power relay cart 4 sequentially changes from the coordinate Pc0(x,y) to the coordinates Pc1(x,y), Pc2(x,y), and Pc3(x,y). As a result, the second cable 7B is reeled out by extension amounts 7Be1, 7Be2, and 7Be3. The length of the second cable 7B has a value obtained by sequentially adding the extension amounts L1B, L2B, L3B to the initial length L0B as the position of the power relay cart 4 changes. In this example, although the length of the first cable 7A does not change, this length may also change.

When the shovel 2 has moved to the coordinate Pa3(x,y), the cable position estimating unit 12A estimates the position of the cable 7 using the history of the movement of the power relay cart 4, that is, the other coordinates Pc0(x,y), Pc1(x,y), Pc2(x,y), and Pc3(x,y) when the power relay cart 4 has moved. For example, the cable position estimating unit 12A obtains a function that passes through four coordinates Pc0(x,y), Pc1(x,y), Pc2(x,y), and Pc3(x,y) by interpolation (for example, spline interpolation), for example, and uses the function as the position of the cable 7 after the movement of the shovel 2 and the like. In this case, a constraint that the length of the cable 7B between the coordinates Pc0(x,y) and Pc3(x,y) is L1B+L2B+L3B is applied, which is the same as the above embodiment.

Moreover, the cable position estimating unit 12A obtains a function that passes through the four coordinates Pc0(x,y), Pc1(x,y), Pc2(x,y), and Pc3(x,y) obtained from the movement of the power relay cart 4, the coordinate Pb0(x,y) of the supporting post 5, and the coordinate Pa3(x,y) of the shovel 2 after the movement by interpolation (for example, spline interpolation), for example, and uses the function as the position of the cable 7 after the movement of the shovel 2 and the like. In this case, a constraint, that the length of the cable 7B between the coordinates Pb0(x,y) and Pa3(x,y) is L0B+L1B+L2B+L3B+L0A is applied, which is the same as above. In this modification, the position of the cable 7 after the movement of the shovel 2 and the like is estimated using the movement history of the power relay cart 4. Thus, since the number of items of the position information (the coordinates following the movement of the power relay cart 4) that can be used when estimating the cable 7 can be increased, the accuracy of estimating the position of the cable 7 after the movement is improved.

When the position of the cable 7 after the movement of the shovel 2 and the like is updated, the management device 10 proceeds to step S106. In step S106, the restricted area setting unit 12B of the management device 10 sets the travel-restricted area DA where the travel of vehicles (in the present embodiment, the shovel 2, the dump truck 3, and the like) is restricted based on the position of the cable 7 estimated by the cable position estimating unit 12A. For example, the restricted area setting unit 12B sets a predetermined area around the position of the cable 7 after the movement of the shovel 2 and the like as the travel-restricted area DA as illustrated in FIG. 1. As an example, the restricted area setting unit 12B generates two boundary lines that are separated to both sides by a predetermined distance from the position of the cable 7 after the movement, of the shovel 2 and the like and that extend along the cable 7. Moreover, the restricted area setting unit 12B sets an area surrounded by the two boundary lines as the travel-restricted area DA and stores the same in the storage unit 13. Subsequently, in step S107, the restricted area setting unit 12B updates the travel-restricted area PA by substituting the travel-restricted area PA which has been stored in the storage unit 13 with the new travel-restricted area DA set in step S100. When the travel-restricted area DA is updated, the management device 10 executes the travel-restricted area setting method according to the present embodiment from the start.

When the travel-restricted area DA is updated, the travel route generating unit 12D of the management device 10 reads the new travel-restricted area DA from the storage unit 13 to generate the travel route PL of the dump truck 3 in the excavation site 1 illustrated in FIG. 1. In this case, the travel route generating unit 12D sets an area excluding the travel-restricted area PA from the entire area of the excavation site 1 as the travel-allowed area PA and generates the travel route PL in the travel-allowed area PA. The management device 10 causes the dump truck 3 to travel in the excavation site 1 based on the newly generated travel route PL. When the travel route PL is generated, in a case where a broken-down vehicle stops in the travel-allowed area PA of the excavation site 1, for example, the travel route generating unit 12D sets a predetermined area around the broken-down vehicle as the travel-restricted area DA to generate the travel route PL. By doing so, since the travel route Pt that is more appropriate for the situation of the excavation site 1 can be generated, it is possible to smoothly perform an excavation operation and a delivery operation.

As described, above, in the embodiment and the first and second modifications, the cable position estimating unit 12A estimates the position of the cable 7 after the movement of the shovel 2 and the like based on at least the information on at least two positions between the shovel 2 and the supporting post 5 and the length of the cable 7 between the shovel 2 and the supporting post 5. By doing so, when the shovel 2, the power relay cart 4, or the like has moved, since the position of the cable 7 can be obtained without measuring the position of the cable 7 on the spot again, it is possible to reduce the workload. Further, since the travel-restricted area GA of the excavation site 1 can be suppressed to an appropriate size as necessary, it is possible to increase the travel-allowed area PA. As a result, even when the dump truck 3 needs to turn, since the turning radius of the dump truck 3 can be also increased, it is possible to suppress wear of the tires of the dumb truck 3 and to suppress the running cost of the dumb truck 3.

Figure 10:
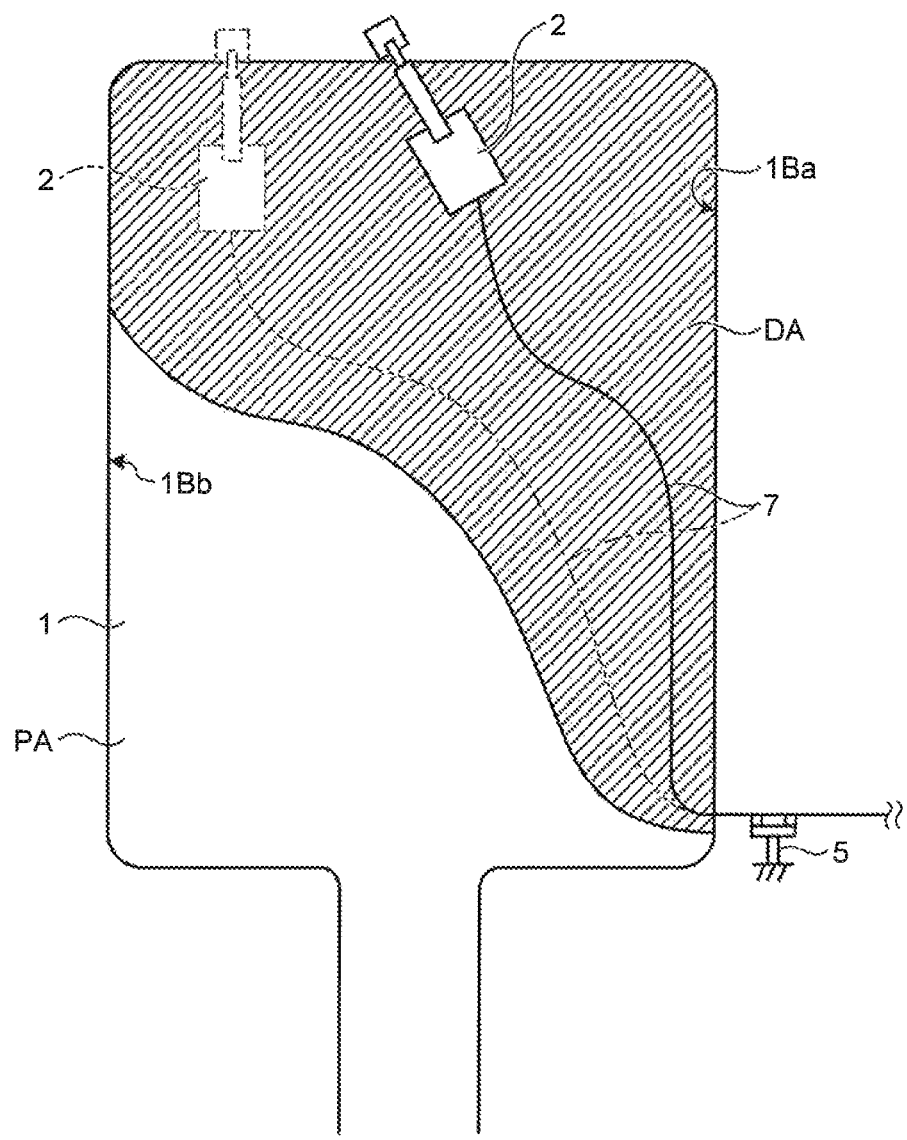
FIG. 10 is an explanatory diagram illustrating a travel-restricted area setting method according to a present comparative example.

FIG. 10 is an explanatory diagram illustrating a travel-restricted area setting method according to the present comparative example. In the present comparative example, the travel-restricted area GA is set based on a range where the shovel 2 and the cable 7 are considered to move within the excavation site 1. By doing so, since the travel-restricted area DA needs to be set with a margin by taking the movement of the shovel 2 and the cable 7 into consideration, the travel-restricted area DT increases and the travel-allowed area PA decreases. Thus, the degree of freedom in setting the travel route Pt of the dump truck 3 decreases, and a case where an unreasonable travel route Pt may be set.

According to the present embodiment and the first and second modifications, when the shovel 2, the bower relay cart 4, or the like has moved, since the position of the cable 7 is estimated and a predetermined area around the position is set again as the travel-restricted area DA, it is possible to decrease the travel-restricted area GA as small as possible. As a result, since the travel-allowed area PA of the excavation site 1 increases, the degree of freedom in setting the travel route PL of the dump truck 3 is improved. Therefore, the present embodiment and the first and second modifications provide an advantage that it is easy to set the turning radius, and the travel route PL with a margin for the passing or shelter for the dump trucks 3.

In the above description, a case where the dump truck 3 travels with no man attended has been described as an example. However, the dump truck 3 may travel with a man attended, that is, the dump truck 3 may be operated by a driver getting on the dump truck 3. In this case, the management device 10 may display the generated travel route PL on a monitor provided in front of the driver's seat of the dump truck 3 to guide the driver of the dump truck 3 so that the dump truck 3 travels along the travel route PL.

<Generation of Moving Direction of Relay Support Body>

Figure 11:
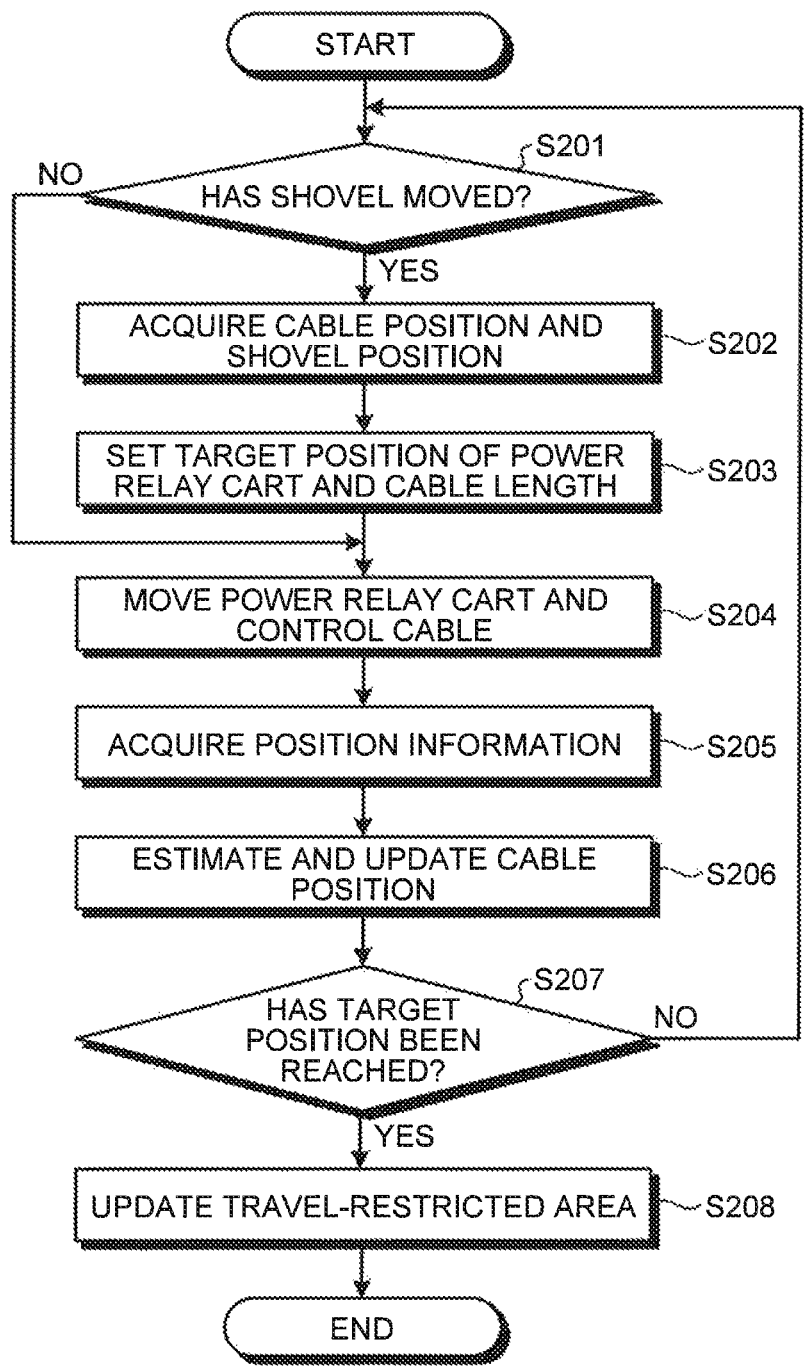
FIG. 11 is a flowchart illustrating a method of generating a moving direction of a relay support body according to the present embodiment.
Figure 12:
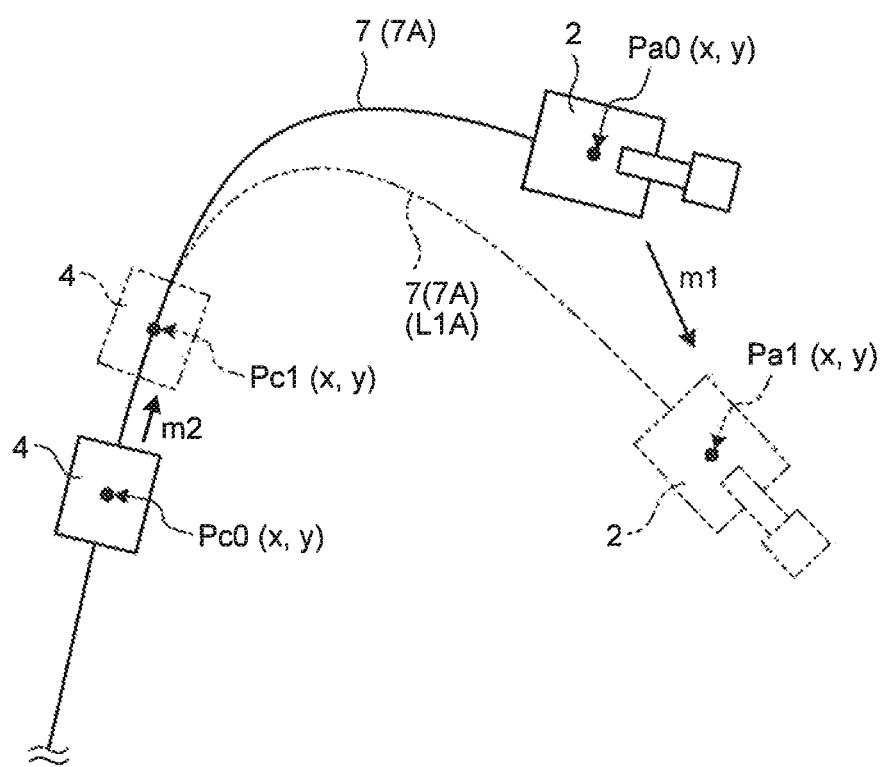
FIG. 12 is an explanatory diagram illustrating the method of generating a moving direction of a relay support body according to the present embodiment.

FIG. 11 is a flowchart illustrating a method of generating a moving direction of the relay support body according to the present embodiment. FIG. 12 is an explanatory diagram illustrating the method of generating the moving direction of the relay support body according to the present embodiment. The function of the relay position movement information generating unit 12C of the management device 10 illustrated in FIG. 2 will be described. The relay position movement information generating unit 12C uses the direction following the cable 7 (the first cable 7A) present between the power relay cart 4 as the relay support body and the shovel 2 as the electric work machine as the moving direction of the power relay cart 4. Although the power relay cart 4 may also move when the shovel 2 moves, it is preferable because the load applied to the cable 7 can be reduced by moving the power relay cart 4 in the direction (the direction indicated by arrow m2 in FIG. 12) following the cable 7. Next, the flow of the method of generating the moving direction of the relay support body will be described.

When the shovel 2 moves, for example, the power relay cart 4 moves in order to follow the movement. When the method of generating the moving direction of the relay support body according to the present embodiment is executed, in a case where the shovel 2 has moved in step S201 (Yes in step S201), the relay position movement information generating unit 12C of the management device 10 illustrated in FIG. 2 proceeds to step S202. When the shovel 2 has not moved (No in step S201), the relay position movement information generating unit 12C proceeds to step S204. The details of step S204 will be described later.

In step S202, the relay position movement information generating unit 12C acquires the position (the cable position) of the cable 7 by reading the same from the storage unit 13 at the processing time of step S202. Moreover, the relay position movement information generating unit 12C acquires the position of the shovel 2 from the shovel controller 2P with the aid of the communication device 18 at the processing time of step S202. Subsequently, in step S203, the relay position movement information generating unit 12C sets the target moving position (target position) of the power relay cart 4 and the length (cable length) L1A of the cable 7 required at that time. The target position and the cable length are set such that, for example, when the shovel 2 moves from the coordinate Pa0 (x,y) to the coordinate Pa1(x,y) (in the direction indicated by arrow m1 in FIG. 12) and the power relay cart 4 moves from the coordinate Pc0(x,y) to the coordinate Pc1(x,y) corresponding to the target position, the curvature of the cable 7 (indicated by a two-dot chain line in FIG. 12) after the movement becomes the largest. The method of setting the target position and the cable length is not limited to this.

When the target position and the cable length are set, in step S204, the relay position movement information generating unit 12C moves the power relay cart 4 toward the target position and controls the first cable drum 44A so that the cable has the cable length set in step S203. Subsequently, in step S205, the relay position movement information generating unit 12C acquires the position information at the present point in time. This position information includes the information on the position of the shovel 2 and the information on the position of the power relay cart 4. In step S206, the cable position estimating unit 12A of the management device 10 estimates the position of the cable 7 at the present point in time based on the position information acquired in step S205 and updates the position of the cable 7 by storing the estimated position in the storage unit 13.

Subsequently, the flow proceeds to step S207. The management device 10 proceeds to step S208 when the power relay cart 4 reaches the target position (the coordinate Pc1(x, y)) (Yes in step S207) and returns to step S201 and executes the subsequent steps when the power relay cart 4 has not reached the target position. When the power relay cart 4 has reached the target position (step S207: Yes), in step S208, the restricted area setting unit 12B of the management device 10 illustrated in FIG. 2 sets a new travel-restricted area DA based on the updated position of the cable 7 and updates the travel-restricted area. DA by storing the new travel-restricted area in the storage unit 13. In this manner, the management device 10 can reduce the load applied to the cable 7 and suppress deterioration in the durability of the cable 7 by moving the power relay cart 4 along the cable 7.

As described above, in the present embodiment and the modifications, the position of the cable is estimated based on at least the information on at least two positions between the electric work machine that receives the supply of electricity from a power supply through the cable and the support body that supports the cable and the length of the cable between the electric work machine and the support body. Moreover, the travel-restricted area where the travel of machines operating in a working site such as an excavation site is restricted is set based on the estimated position of the cable. By doing so, since the travel restricted area can be suppressed to an appropriate size as necessary, it is possible to decrease the travel-restricted area in the working site and to increase the travel-allowed area. As a result, it is possible to improve the degree of freedom in setting the travel route of machines used in the working site and to increase the movable range of the machines to thereby reduce the load to the machines and operate the machines with a margin. In particular, in recent mines, an increasing number of electric power shovels are used, and cables are often pulled around in excavation sites. The present embodiment and the modifications are ideally applicable to mines and the like where electric power shovels connected to a cable are used.

REFERENCE SIGNS LIST

1 Excavation Site
1Ba, 1Bb Side Portion
1G Excavation Side
1I Entrance Side
2A, 3A, 4A GPS Antenna
2 Shovel
2P Shovel Controller
2B, 3B, 4B Wireless Communication Antenna
3 Dump Truck
3P Dump Truck Controller
4 Power Relay Cart
4P Relay Cart Controller
4S Moving Relay Post
5 Supporting Post
6 External Power Supply Unit
7 Cable
7A First Cable
7B Second Cable
8a, 8b, 8c GPS Satellite
9 Passage
10 Management Device
11 Processing Device
12 Arithmetic Unit
12A Cable Position Estimating Unit
12B Restricted Area Setting Unit
12C Relay Position Movement Information Generating Unit
12D Travel Route Setting Unit
13 Storage Unit
14 Database
15 Input And Output Unit
16 Display Device
17 Input Device
18 Communication Device
18A Management Device-Side Wireless Communication Antenna
21 Motor Controller
22 Crawler Belt
23 Travel Motor
24 Revolving Motor
25 Hydraulic Pressure Generating Motor
26 Hydraulic Pump
31 Wheel
32 Motor
33 Internal Combustion Engine
34 Generator
35 Motor Controller
36 Current Collector
40 Traveling Device
41 Crawler Belt
42 Travel Motor
43 Cart
44A First Cable Drum
44B Second Cable Drum
45 Power Transmission Relay Unit
46 Communication Device
47 Post
48 Cable Support Body
48S Insulator
48F Lifting Hook
49 Pedestal

The invention claimed is:

1. A travel-restricted area setting system for an unmanned conveying vehicle, comprising:
an electric work machine that operates with electricity supplied via a cable from an external, power supply, and includes a controller configured to detect and transmit primary position data corresponding to a position thereof;
a stationary support body that supports the cable at a fixed location;
a management device configured to receive the primary position data transmitted from the controller of the work machine communication device; and
a movable relay support body disposed between the stationary support body and the electric work machine, movably supporting the cable;
wherein the management device is configured to estimate a position of the cable based on at least the primary position data corresponding to the position of the electric work machine, information on a position of the stationary support body, information on a position of the relay support body, and a length of the cable between the electric work machine and the stationary support body, and to set a travel-restricted area where a travel of the unmanned vehicle is restricted based on the estimated position of the cable,
wherein the position of the cable is estimated based on an estimation line which passes through the position of the electric work machine and the position of the stationary support body, a length of the estimation line being the same as the length of the cable, and
wherein the management device is configured to estimate the estimation line whenever a moving distance of the electric work machine exceeds a predetermined threshold moving distance, and
wherein the management device is configured to equate a curved line passing through the position of the electric work machine and the position of the stationary support body whose length is the same as the length of the cable as the estimation line when a position of an apex of the curved line is on a same side as a side of a position of an estimation line previously calculated with respect to a straight line connecting the position of the electric work machine and the position of the stationary support body.

2. The travel-restricted area setting system for the unmanned conveying vehicle according to claim 1, wherein the management device is configured to estimate the position of the cable using the information on the position of the relay support body detected by the relay support body position detecting device.

3. The travel-restricted area setting system for the unmanned conveying vehicle according to claim 1, wherein the management device uses a history of a change in the position of the relay support body due to a movement of the relay support body as the information on the position of the relay support body.

4. The travel-restricted area setting system for the unmanned conveying vehicle according to claim 1, wherein the management device uses a direction following the cable between the relay support body and the electric work machine as a moving direction of the relay support body.

5. The travel-restricted area setting system for the unmanned conveying vehicle according to claim 1, wherein the electric work machine is an electric power shovel used in a mine.

6. A non-transitory computer readable medium having stored thereon a computer program for setting a travel-restricted area for an unmanned conveying vehicle in a workplace which has an electric work machine operating with electricity supplied via a cable from an external power supply, the computer program comprising a set instructions for causing the machine to perform the steps of:
  estimating a position of the cable based on at least information on a position of the electric work machine, information on a position of a stationary support body that supports the cable at a fixed location, information on a position of a movable relay support body which is disposed between the stationary support body and the electronic work machine and movably supports the cable, and a length of the cable between the electric work machine and the stationary support body, and
  setting the travel-restricted area based on the estimated position of the cable,
  wherein the position of the cable is estimated based on an estimation line which passes through the position of the electric work machine and the position of the stationary support body, a length of the estimation line being the same as the length of the cable, and
  wherein the management device is configured to estimate the estimation line whenever a moving distance of the electric work machine exceeds a predetermined threshold moving distance, and
  wherein the management device is configured to equate a curved line passing through the position of the electric work machine and the position of the support body whose length is the same as the length of the cable as the estimation line when a position of an apex of the curved line is on a same side as a side of a position of an estimation line previously calculated with respect to a straight line connecting the position of the electric work machine and the position of the stationary support body.

7. The computer readable medium having the computer program stored thereon for setting the travel-restricted area for the unmanned conveying vehicle according to claim 6, wherein a history of a change in the position of the relay support body due to a movement of the relay support body is used as the information to estimate the position of the relay support body.

8. The computer readable medium having the computer program stored thereon for setting the travel-restricted area for the unmanned conveying vehicle according to claim 6, wherein a direction following the cable between the relay support body and the electric work machine is used as a moving direction of the relay support body.

9. The computer readable medium having the computer program stored thereon for setting the travel-restricted area for the unmanned conveying vehicle according to claim 6, wherein the electric work machine is an electric power shovel used in a mine.

10. The travel-restricted area setting system for the unmanned conveying vehicle according to claim 2, wherein the management device uses a history of a change in the position of the relay support body due to a movement of the relay support body as the information on the position of the relay support body.

11. The travel-restricted area setting system for the unmanned conveying vehicle according to claim 1, wherein the relay support body is movable relative to the stationary support body and configured to reel in and out at least one of a first length of the cable between the electric work machine and the relay support body, and a second length of the cable between the relay support body and the stationary support body, and wherein the relay support body has a controller configured to transmit secondary position data corresponding to a position of the relay support body.

12. The travel-restricted area setting system for the unmanned conveying vehicle according to claim 11, wherein the relay support body is configured to reel in and out both the first length of cable between the electric work machine and the relay support body, and the second length of cable between the relay support body and the stationary support body.

* * * * *